US005557164A

United States Patent [19]

Chen et al.

[11] Patent Number: 5,557,164

[45] Date of Patent: Sep. 17, 1996

[54] CATHODE RAY TUBE WITH MISCONVERGENCE COMPENSATION

[75] Inventors: Shiou-Chern Chen, Pan-Chiao; Chi-Fang Huang, Taipei, both of Taiwan

[73] Assignee: Chunghwa Picture Tubes, Ltd., Taiwan

[21] Appl. No.: 404,905

[22] Filed: Mar. 15, 1995

[51] Int. Cl.[6] .......................... H01S 29/70; H01S 29/50; H01F 7/00

[52] U.S. Cl. .......................... 313/440; 313/412; 335/210

[58] Field of Search .................................... 313/412, 426, 313/430, 431, 433, 440; 335/210, 211

[56] References Cited

U.S. PATENT DOCUMENTS

| | | | |
|---|---|---|---|
| 4,237,437 | 12/1980 | Vink et al. | 335/211 |
| 4,600,858 | 7/1986 | Iwasaki et al. | 313/431 X |
| 4,625,144 | 11/1986 | Kornaker | 313/412 |
| 4,782,264 | 11/1988 | Yamazaki et al. | 313/413 |
| 4,794,300 | 12/1988 | Beelaard et al. | 313/440 |
| 4,823,046 | 4/1989 | Sluyterman | 313/431 |
| 4,857,796 | 8/1989 | Amano et al. | 313/431 X |
| 4,896,071 | 1/1990 | Pons | 335/210 X |
| 4,939,414 | 7/1990 | Sluyterman | 313/431 |
| 5,117,152 | 5/1992 | Duwaer et al. | 313/426 |
| 5,250,876 | 10/1993 | Van Mierlo et al. | 313/440 |

FOREIGN PATENT DOCUMENTS

| | | | |
|---|---|---|---|
| 0071261 | 6/1981 | Japan | 313/431 |

*Primary Examiner*—Michael Tokar
*Assistant Examiner*—Mack Haynes
*Attorney, Agent, or Firm*—Donald S. Cohen

[57] ABSTRACT

The present is directed to a cathode ray tube having compensation plates for compensating the misconvergence of the paths of the beams of the tube resulting from the earth's magnetic fields, The cathode ray tube includes a neck portion and a funnel portion with a face plate, A gun is in the neck portion and is adapted to generate three electron beams and direct the beams toward the face plate. Purity convergence magnets are around the tube adjacent the neck, The compensation plates are between the purity convergence magnets and the tube and extend in parallel relation to the beam paths at opposite sides of the beams.

8 Claims, 3 Drawing Sheets

CATHODE RAY TUBE WITH MISCONVERGENCE COMPENSATION

FIELD OF THE INVENTION

The present invention is directed to a cathode ray tube (CRT) having misconvergence compensation means, and, more particularly, to a CRT which includes means for adjusting the paths of the electron beams to compensate for the earths magnetic fields.

BACKGROUND OF THE INVENTION

A cathode ray tube (CRT), in general, includes a glass tube having a relatively narrow neck at one end and a funnel section ending in an enlarge face plate at the other end. A screen is on the inner surface of the face plate, and an electron gun is in the neck. For a color CRT, the electron gun generates three separate electron beams which are aligned along a plane with one beam being between the other two beams. The beams are directed against the screen on the face plate to generate a picture. Between the gun and the face plate and surrounding the tube is a yoke of a magnetic winding which control the movement of the beam over the face plate.

In the manufacture of a CRT, it is necessary to adjust the position of the yoke along the tube so that the electron beams are properly directed to their respective pixels on the screen. This adjustment is carried out by a yoke adjust moving (YAM) step. In the traditional way of carrying out the YAM, if the CRT's longitudinally axis is along the North-South direction with the North-South earth magnetic field coming from the rear end of the CRT and out the front face, a transversal moving component of each electron side beam (the blue or red beam), will experience the earth's magnetic field. As shown in FIG. 1, this results in the beams having an opposite up-down departure when they hit the screen according to the Lorentz Law. As shown in FIG. 1, one of the beams, such as the blue beam, is moved upwardly with respect to its normal path, whereas the other beam, such as the red beam, is moved downwardly. However, if the earth's magnetic field is coming from the front face to the rear end of the CRT, the misconvergence is the converse about the beam positions. As shown in FIG. 2, under this condition, the one beam, such as the blue beam, is moved downwardly from its normal path whereas the other beam, such as the red beam, us moved upwardly. Therefore, it would be desirable to provide the tube with means for overcoming this misconvergence so that the beams will be directed properly on their pixels of the screen.

SUMMARY OF THE INVENTION

The present invention is directed to a cathode ray tube having a neck portion at one end, and a funnel portion having a face plate its other end. A gun is in the neck portion and is adapted to generate three electron beams and direct the beams along the tube to the face plate. A yoke is around the tube for moving the beams along the face plate. Means is around the neck portion for compensating for misconvergence of the paths of the beams caused by the effect of the earth's magnetic fields on the beams.

The present invention is further directed to a cathode ray tube having a tube with a cylindrical neck portion at one end thereof and a funnel portion with a face plate at the other end thereof. A gun is in the neck portion of the tube at its end away from the funnel. The gun is adapted to generate three electron beams and direct the beams along the tube to the face plate along spaced, side-by-side parallel paths which are along a common plane. A yoke is around the tube spaced rom the gun and is adapted to move the beams over the face plate. Purity compensating magnets are around the neck portion adjacent the gun. Compensation plates of a magnetic material are between the purity convergence magnets and the neck of the tube for compensating for the misconvergence of the beams caused the earth's magnetic fields.

DETAILED DESCRIPTION

Figure 3:
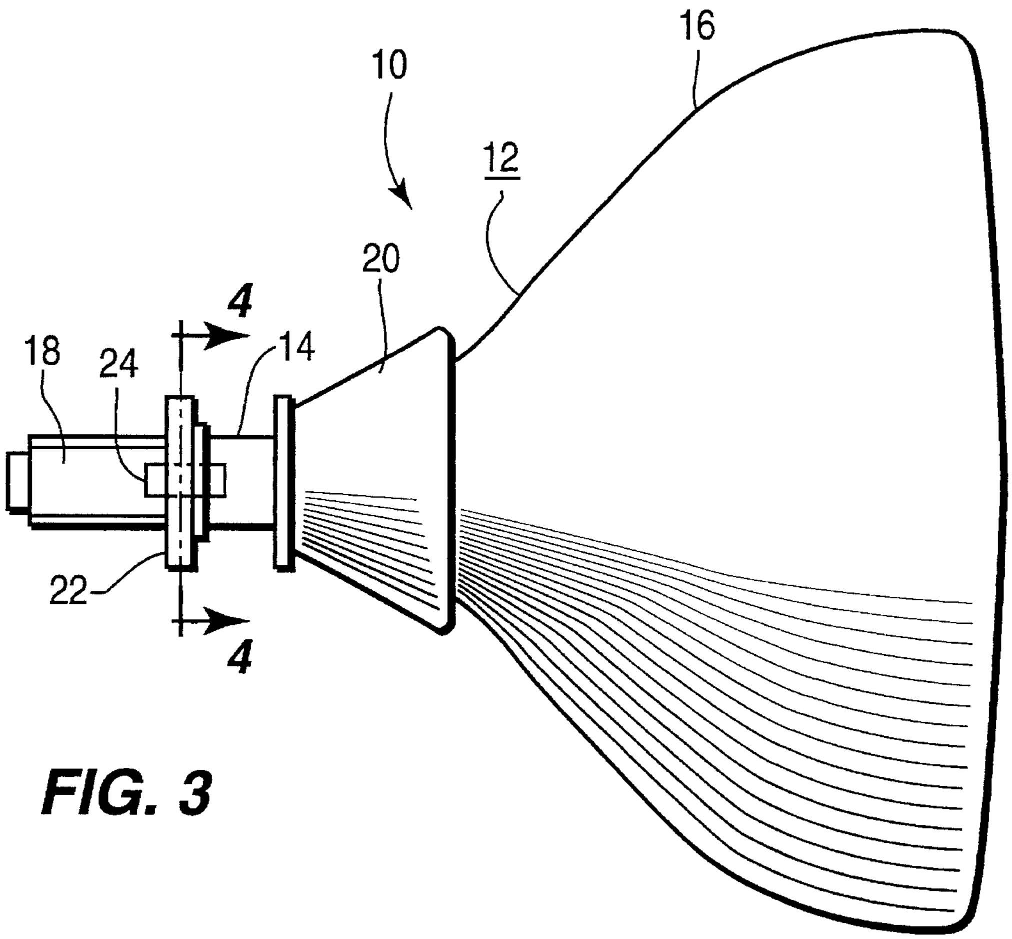
FIG. 3 is a schematic side view of a CRT having therein the present invention for compensating for the earth's magnetic fields.

Referring to FIG. 3, there is shown a cathode ray tube (CRT) 10 having therein the compensating means of the present invention. CRT 10 comprises a glass tube 12, having a cylindrical neck 14 at its rear end and a funnel portion 16 at its front end. The funnel portion 16 has a face plate, not shown, on its front surface and a screen, not shown, on the inner surface of the face plate. The screen is formed of three different phosphors, one for each color, arranged in an array of pixels. An electron gun 18 is in the neck portion 14 at the rear end of the neck portion 14. The electron gun 18 is formed of various electrodes which are arranged to generate three separate electron beams 26, 28 and 30 (see FIG. 4) and direct the beams 26, 28 and 30 through the tube 12 toward the face plate. The beams 26, 28 and 30 are generally in spaced side-by-side relationship along a common plane. Around tube 12 between the electron gun 18 an the face plate is a yoke 20. As is well known in the art, the yoke is formed of a plurality of magnetic windings which generate a magnetic field so as to move the electrons beams across the screen so as to form a picture on the screen.

Figure 4:
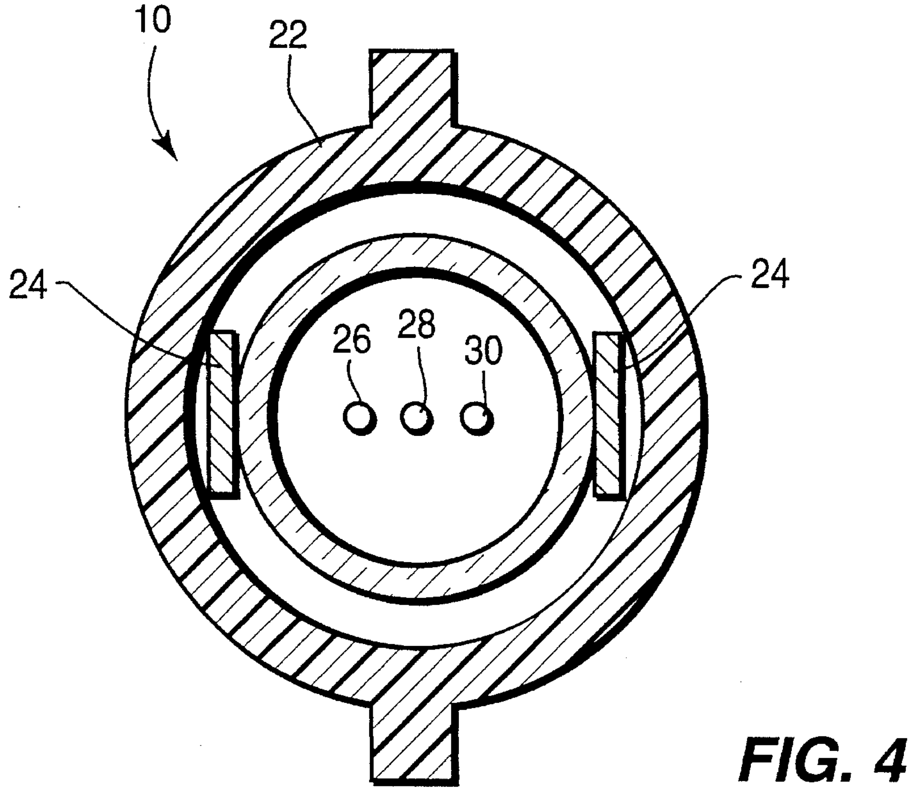
FIG. 4 is a sectional view along line 4—4 of FIG. 3.

Adjacent the electron gun 18 and around the neck 14 of the tube are purity convergence magnets (PCM) 22 which serve to correct static misconvergence between the side beams and the center beam. As shown in FIG. 4, there are two compensation plates 24 of a magnetic material which extend between the purity convergence magnets 22 and the neck 14 of the tube 12. The compensation plates 24 are in parallel relation and extend along and parallel to the side electron beams 26 and 30. The compensation plate 24 may be secured to the purity convergence magnets 22 to hold them in position.

Figure 1:
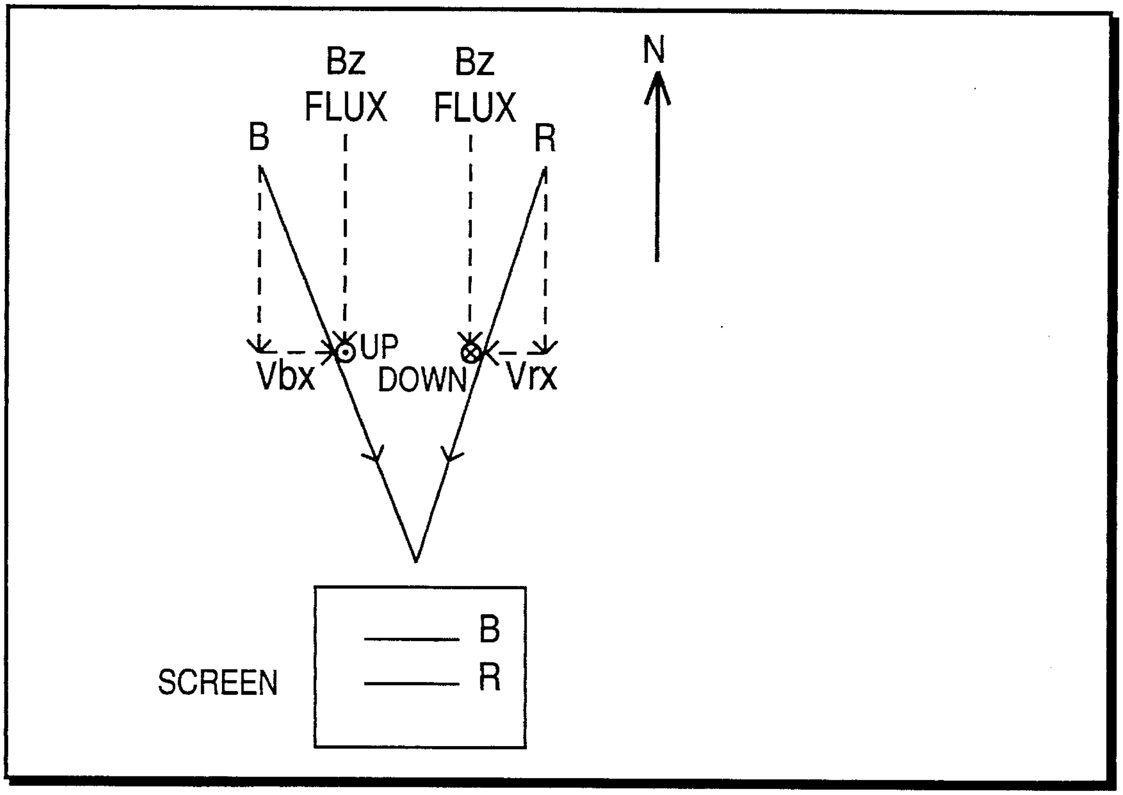
FIG. 1 is a graph showing the misconvergence of the electron beams as a result of the earth's magnetic fields in one direction.
Figure 5:
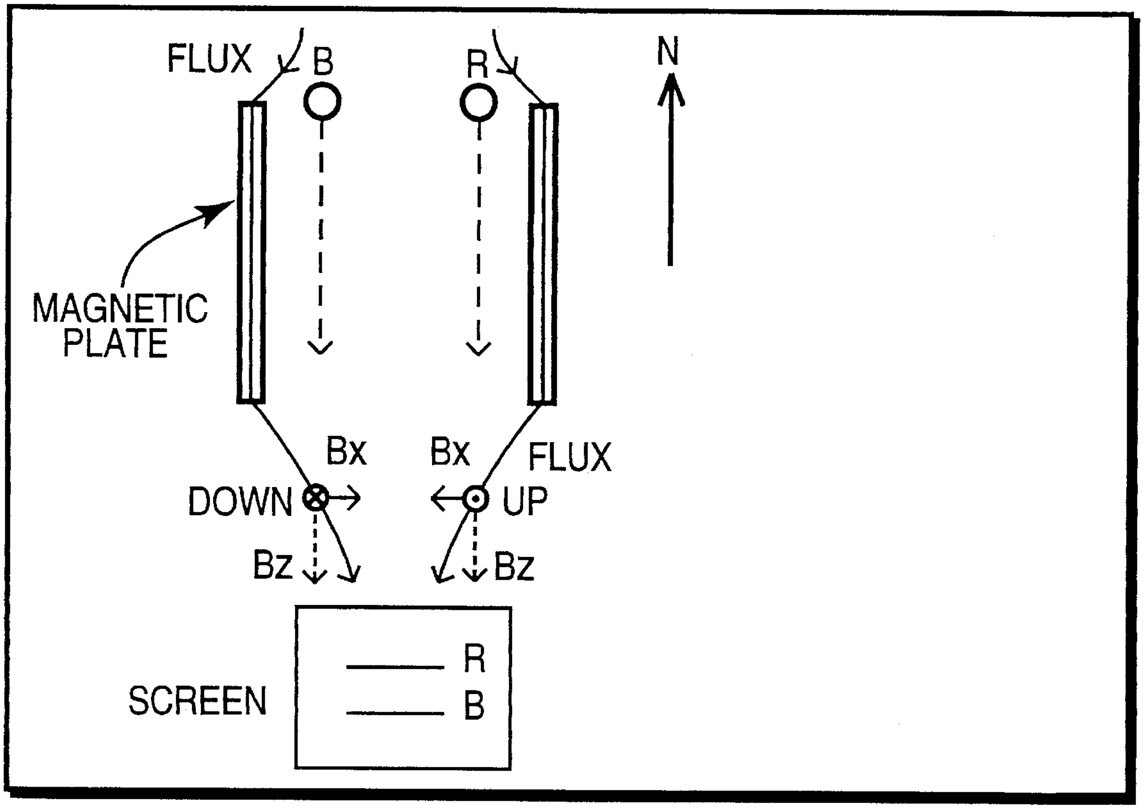
FIG. 5 is a graph showing the compensation provided by the present invention with the earth's magnetic field being in one direction.

In the operation of the CRT 10, the compensation plates 24 provide two magnetic flux paths for the earth's magnetic field, which is supposed to be parallel to the longitudinal axis of the CRT. Considering the situation as described with regard to FIG. 1, with the earth's magnetic field coming from the rear of the tube 12 and out through the face plate, the magnetic flux of the earth's magnetic field will flow through the compensation plates 24 as shown in FIG. 5. When the magnetic flux comes out from the compensation plates 24 it creates a transversal component which pulls down one of the side beams, such as the blue beam, and pulls up the other side beam, such as the red beam. Comparing this to the effect of the earth's magnetic field on the beams as shown and described with regard to FIG. 1, it can be seen that the effect of the compensation plates 24 is directly opposite to the normal effect of the earth's magnetic field on the beams. Thus, the effect of the compensation plates 24 compensates for the normal effect of the earth's magnetic field on the beams. Therefore, the misconvergence of the beams caused by the compensation plates 24 minimizes the adverse misconvergence caused by the earth's magnetic field so that the beams will impinge properly on the pixels of the screen.

Figure 2:
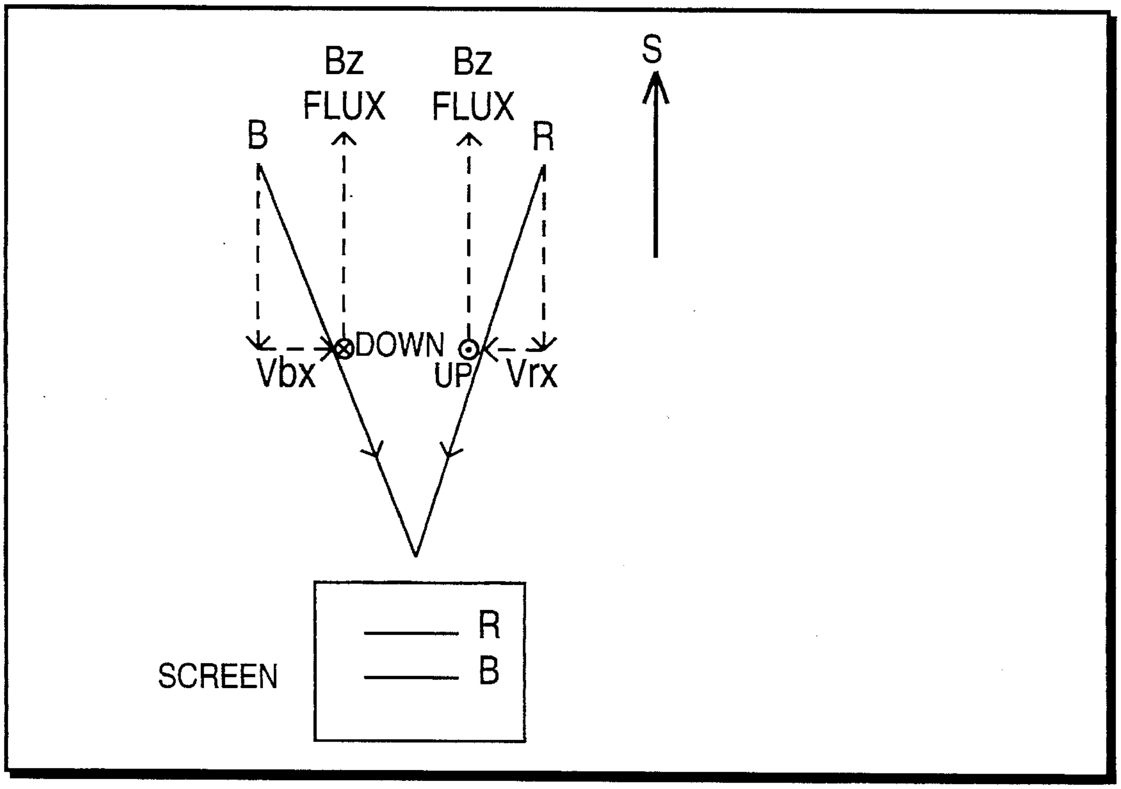
FIG. 2 is a graph showing the misconvergence of the electron beams as a result of the earth's magnetic fields in the direction opposite to that shown in FIG. 1.
Figure 6:
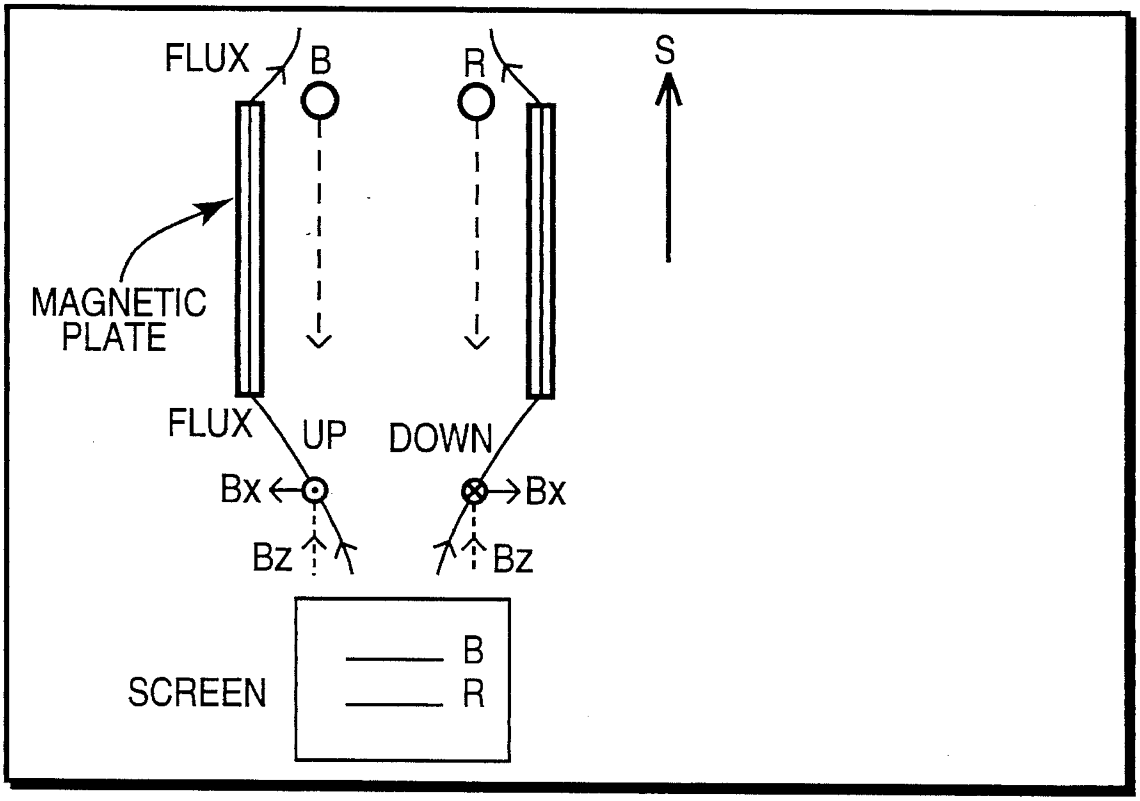
FIG. 6 is a graph showing the compensation provided by the present invention with the earth's magnetic filed being in the direction opposite that shown in FIG. 5.

Considering the situation shown and described with regard to FIG. 2, wherein the earth's magnetic field enters the front of the tube 12 and goes out the rear, the effect of the compensation plates 24 is opposite to that shown and described with regard to FIG. 5. As shown in FIG. 6, under these conditions, the compensation plates 24 causes the flux path of earth's magnetic field to pass therethrough resulting in a misconvergence of the outer beams. However, in this case the one beam, such as the blue beam, is moved upwardly, and the other beam, such as the red beam, is moved downwardly. Comparing this with the normal effect of the earth's magnetic field shown in FIG. 2, it can be seen that the misconvergence caused by the compensation plates 24 is directly opposite that normally caused by the earth's magnetic field. Therefore, the misconvergence resulting from the earth's magnetic field is minimized so that the beams will impinge properly on the pixels of the screen.

Thus, it can be seen that the compensation plates 24 of the present invention result in a misconvergence of the outer beams of the tube which is directly opposite the misconvergence normally caused by the earth's magnetic field. This misconvergence caused by the compensation plates 24 minimizes the misconvergence normally caused by the earth's magnetic field so that the beams will properly impinge on the pixels of the screen of the CRT 10.

What is claimed is:

1. A cathode ray tube comprising:

a tube having a cylindrical neck portion at one end and a funnel portion at its other end;

a gun in the neck portion adapted to generate three electron beams and direct the beams along the tube to the face plate;

purity compensating magnets around the tube adjacent the gun;

a yoke around the tube for causing the beams to move across the face plate; and means around the neck portion within the purity compensating magnets for compensating the misconvergence of the paths of the beams caused by the effect of the earth's magnetic fields on the beams.

2. The cathode ray tube of claim 1 in which the misconvergence compensating means comprises a pair of plates of a magnetic material between the neck of the tube and the purity compensating magnets.

3. The cathode ray tube of claim 2 in which the compensation plates extend along the purity compensating magnets in parallel relation.

4. The cathode ray tube of claim 3 in which the gun is adapted to generate three beams which are directed along the tube in space, side-by-side relation along a common plane, and the compensation plates are at opposite sides of the paths of the beams along the plane.

5. The cathode ray tube of claim 4 in which the compensation plates extend in substantially parallel relation to the paths of the beams.

6. A cathode ray tube comprising:

a tube having a cylindrical neck portion at one end thereof, and a funnel portion with a face plate at the other end thereof;

a gun in the neck portion of the tube at it ends away from the funnel portion, said gun being adapted to generate three electron beams and dire t the beams along the tube along spaced, side-by-side parallel paths along a common plate toward the face plate;

a yoke around the tube spaced from the gun and adapted to move the beams over the face plates;

purity compensating magnets around the neck portion adjacent the gun; and compensation plates of a magnetic material between the purity compensating magnets and the neck portion of the tube for compensating for the misconvergence of the beams caused by the earth's magnetic fields.

7. The cathode ray tube of claim 6 in which the compensation plates extend in parallel relation to the paths of the beams.

8. The cathode ray tube of claim 7 in which the compensation plates are at opposite sides of the beam paths along the common plane.

* * * * *